United States Patent
Peroulas

(10) Patent No.: US 10,103,756 B1
(45) Date of Patent: Oct. 16, 2018

(54) RADIO INTERFERENCE DETECTION

(71) Applicant: Google Inc., Mountain View, CA (US)

(72) Inventor: James Peroulas, San Mateo, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/227,071

(22) Filed: Aug. 3, 2016

(51) Int. Cl.
*H04W 64/00* (2009.01)
*H04B 1/04* (2006.01)
*H04B 17/10* (2015.01)

(52) U.S. Cl.
CPC .......... *H04B 1/0475* (2013.01); *H04B 17/10* (2015.01)

(58) Field of Classification Search
CPC ..... H04B 15/00; H04B 1/1027; H04W 24/00; H04W 16/14; H04W 64/00; H04W 72/082
See application file for complete search history.

(56) References Cited

U.S. PATENT DOCUMENTS

| | | | |
|---|---|---|---|
| 5,048,015 A * | 9/1991 | Zilberfarb | H04B 1/1027 370/312 |
| 8,862,060 B2 | 10/2014 | Mayor et al. | |
| 9,287,995 B2 | 3/2016 | Jindal et al. | |
| 2002/0145562 A1* | 10/2002 | McLain | H04B 7/18508 342/378 |
| 2003/0017830 A1* | 1/2003 | Kayama | H04W 72/0446 455/450 |
| 2004/0157563 A1 | 8/2004 | McLain et al. | |
| 2012/0224497 A1 | 9/2012 | Lindoff et al. | |
| 2015/0139048 A1 | 5/2015 | Lou | |

OTHER PUBLICATIONS

International Search and Written Opinion for related PCT Application No. PCT/US2017/042791 dated Sep. 15, 2017.

* cited by examiner

*Primary Examiner* — Dong-Chang Shiue
(74) *Attorney, Agent, or Firm* — Honigman Miller Schwartz and Cohn LLP

(57) ABSTRACT

A method for identifying an interfering transmitter in a network is disclosed. The method includes receiving an interference indication indicating interference between transmitters in the network. The method includes ceasing transmitting operations of all of the transmitters in the network for a threshold period of time. The method includes soliciting an interference assessment of the network for the threshold period of time when all of the transmitters in the network ceased the transmitting operations. When the interference assessment indicates cessation of the interference between the transmitters in the network, the method includes determining that the interfering transmitter resides inside of the network; and executing an interference isolation routine configured to identify the interfering transmitter.

27 Claims, 9 Drawing Sheets

RADIO INTERFERENCE DETECTION

TECHNICAL FIELD

This disclosure relates to radio interference detection between two or more transmitters of a communication system.

BACKGROUND

A wireless communication network is a large distributed system for receiving information (signal) and transmitting the information to a destination. Use of radio frequency bands of the electromagnetic spectrum is regulated by governments in most countries, in a Spectrum Management process known as frequency allocation or spectrum allocation. Since radio propagation does not stop at national boundaries, governments have sought to harmonize the allocation of radio frequency bands and their standardization. On a global level, there are several government organizations that work together to determine the standards for frequency allocation, such as, the International Telecommunication Union (ITU), the European Conference of Postal and Telecommunication Administration (CEPT), and the inter-American Telecommunication Commission (CITEL). The Federal Communication Commission (FCC) is an independent agency of the United States Government created to regulate interstate communications by radio, television, wire, satellite, and cable in all 50 states, the District of Colombia, and the U.S. territories.

A radio spectrum is the range of frequencies that is used for wireless applications, such as broadcast television and radio, cell phone, satellite radio and television, wireless computer networks, Bluetooth, Global Positioning Services, police dispatch, and many other general and specialized applications that we use every day. Usually, it is difficult for these applications to utilize the same frequencies simultaneously. For example, if a local television station uses the same frequency as a cell phone, then the cell phone would not work very well due to interference from the television station, or the television picture would be fuzzy due to interference from the cell phone, or perhaps both. Therefore, to avoid such interference, the radio spectrum is carved up into different portions, and each portion is allocated to one or more services that, generally speaking, may be able to co-exist with each other.

The use of the radio spectrum is at an all-time high due to the increase use of mobile voice and data. As a result, the demand for additions, modifications, and waivers to existing spectrum allocation is also growing. As such, the FCC decided to create the Citizen Broadband Radio Service (CBRS) in the 3.5 GHz band, making 150 MHz available for mobile broadband and other commercial services. The CBRS includes the band of spectrum from 3550 MHz to 3700 MHz. To date, only the 3650-3700 MHz portion of the band has been accessible to non-federal operators using a non-exclusive licensing process. The 150 MHz that the CBRS is opening up for use, employs a 3-tier access/licensing model. The 3-tier access includes incumbent access, priority access licenses (PAL), and general authorized access (GAA).

By increasing the spectrum band usage in a wireless communication system, it may become difficult to identify if a transmitter signal is being interfered with by another transmitter. In addition, it may also be difficult to identify which transmitter is causing the interference. Direction finding (DF) antennas are often used to identify rogue transmitters. DF or radio direction finding (RDF) is the measurement of the direction from which a received signal was transmitted. DF combines the direction information from two or more suitably spaced receivers (or a single mobile receiver); the source of a transmission may be located via triangulation. In some examples, RD is used in navigation of ships and aircrafts, to locate emergency transmitters for search and rescue, for tracking wildlife, and to locate illegal or interfering transmitters. DF antennas are difficult to use for several reasons, including but not limited to, the fact that the direction that a signal arrives at a certain location does not always indicate the location of the transmitter. For example, the signal of the transmitter may have bounced off a physical structure and tracing the signal back from the victim transmitter may lead back to the physical structure.

SUMMARY

One aspect of the disclosure provides a method for identifying an interfering transmitter in a network. The method includes receiving, at data processing hardware, an interference indication indicating interference between two or more transmitters in the network. The method includes ceasing, by the data processing hardware, transmitting operations of all of the transmitters in the network for a threshold period of time. The method includes soliciting, by the data processing hardware, an interference assessment of the network for the threshold period of time when all of the transmitters in the network ceased the transmitting operations. When the interference assessment indicates cessation of the interference between the two or more transmitters in the network, the method includes determining, by the data processing hardware that the interfering transmitter resides inside of the network; and executing, by the data processing hardware, an interference isolation routine configured to identify the interfering transmitter.

Implementations of the disclosure may include one or more of the following optional features. In some implementations, when the interfering transmitter is identified, the method further includes, altering, by the data processing hardware, a transmission property of the interfering transmitter. The altered transmission property includes ceasing the interference between the two or more transmitters in the network. The transmission property may include a transmission frequency.

In some implementations, the interference isolation routine includes sequentially ceasing the transmitting operation of each transmitter in the network, one at a time, to identify the interfering transmitter. For each transmitter having the ceased transmitting operation, the method may include soliciting the interference assessment of the network while the transmitter has ceased the transmitting operation. In addition, for each transmitter having the ceased transmitting operation, when the interference assessment indicates cessation of the interference between the two or more transmitters in the network, the method may also include determining that the interfering transmitter is the transmitter having the ceased transmitting operation. Moreover, for each transmitter having the cessation of the interference between the two or more transmitters in the network, when the interference assessment indicates continuance of the interference between the two or more transmitters in the network, the method may also include continuing to the next sequential transmitter in the network.

In some examples, the interference isolation routine includes a recursive operation. The recursive operation includes ceasing the transmitting operations of a collection of transmitters in the network and soliciting the interference assessment of the network while the collection of transmitters has ceased the transmitting operations. When the interference assessment indicates cessation of the interference between the two or more transmitters in the network, the recursive operation includes determining that the interfering transmitter is one of the collection of transmitters having the ceased transmitting operations and continuing the recursive operation on a subset of the collection of transmitters in the network. In addition, when the interference assessment indicates continuance of the interference between the two or more transmitters in the network, the method may include continuing the recursive operation on another collection of transmitters in the network.

In some implementations, the method includes ceasing the transmitting operations of all of the transmitters in the network periodically or according to an on/off pattern. In some examples, the method includes randomly ceasing the transmitting operations of all of the transmitters in the network for the threshold period of time.

Another aspect of the disclosure provides a system for determining an interfering transmitter in a network having multiple transmitters. The system includes data processing hardware and memory hardware in communication with the data processing hardware. The memory hardware stores instructions that when executed on the data processing hardware cause the data processing hardware to perform operations. The operations include receiving an interference indication indicating interference between two or more transmitters in a network, and ceasing transmitting operations of all of the transmitters in the network for a threshold period of time. The operations also include soliciting an interference assessment of the network for the threshold period of time when all of the transmitters in the network ceased the transmitting operations. When the interference assessment indicates cessation of the interference between the two or more transmitters in the network, the operations further include determining that the interfering transmitter resides inside of the network, and executing an interference isolation routine configured to identify the interfering transmitter resides inside of the network.

This aspect may include one or more of the following optional features. In some examples, the operations further include altering a transmission property of the interfering transmitter. The altered transmission property includes ceasing the interference between the two or more transmitters in the network. The transmission property may include a transmission frequency.

In some implementations, the interference isolation routine includes sequentially ceasing the transmitting operation of each transmitter in the network, one at a time, to identify the interfering transmitter. For each transmitter having the ceased transmitting operation, the operations further include soliciting the interference assessment of the network while the transmitter has ceased the transmitting operation. In addition, for each transmitter having the ceased transmitting operation, when the interference assessment indicates cessation of the interference between the two or more transmitters in the network, the operations include determining that the interfering transmitter is the transmitter having the ceased transmitting operation. Furthermore, for each transmitter having the ceased transmitting operation, when the interference assessment indicates continuance of the interference between the two or more transmitters in the network, the operations further include continuing to the next sequential transmitter in the network.

In some examples, the interference isolation routine includes a recursive operation. The recursive operation includes ceasing the transmitting operations of a collection of transmitters in the network, and soliciting the interference assessment of the network while the collection of transmitters has ceased the transmitting operations. When the interference assessment indicates cessation of the interference between the two or more transmitters in the network, the recursive operation includes determining that the interfering transmitter is one of the transmitters having the ceased transmitting operations, and continuing the recursive operation on a subset of the collection of transmitters in the network. When the interference assessment indicates continuance of the interference between the two or more transmitters in the network, the recursive operation includes continuing the recursive operation on another collection of transmitters in the network.

In some implementations, the operations further include ceasing the transmitting operations of all of the transmitters in the network periodically or according to an on/off pattern. In other implementations, the operations include randomly ceasing the transmitting operations of all of the transmitters in the network for the threshold period of time.

Another aspect of the disclosure provides a method for determining an interfering transmitter in a network having multiple transmitters. The method includes receiving, at data processing hardware, an interference indication indicating interference between two or more transmitters in a network. For each transmitter in the network, the method includes causing, by the data processing hardware, the transmitter to transmit a corresponding sequence for a threshold period of time and determining, by the data processing hardware, whether a frequency offset of the interference between the two or more transmitters in the network corresponds to the transmitter. When the frequency offset of the interference between the two or more transmitters in the network corresponds to the transmitter, the method includes altering, by the data processing hardware, a transmission property of the transmitter. The altered transmission property ceasing the interference between the two or more transmitters in the network.

This aspect may include one or more of the following optional features. In some examples, the corresponding sequence of each transmitter is unique to the corresponding transmitter. In other examples, the corresponding sequence of each transmitter occupies a full corresponding transmitted bandwidth. The corresponding sequence of each transmitter may occupy a portion of a corresponding transmitted bandwidth.

Another aspect of the disclosure provides a method for determining an interfering transmitter in a network having multiple transmitters. The method includes receiving, at data processing hardware, an interference indication indicating interference between two or more transmitters in a network and ceasing, by the data processing hardware, transmitting operations of a group of transmitters in the network for a threshold period of time. The method may also include soliciting, by the data processing hardware, an interference assessment of the network for the threshold period of time when all of the transmitters in the network ceased the transmitting operations. When the interference assessment indicates cessation of the interference between the two or more transmitters in the network, the method includes determining, by the data processing hardware that an interfering transmitter resides outside of the group of transmitters in the network. When the interference assessment indicates continuance of the interference between the two or more transmitters in the network, the method includes determining, by the data processing hardware that the interfering transmitter resides inside of the group of transmitters in the network and executing, by the data processing hardware, an interference isolation routine configured to identify the interfering transmitter.

This aspect may include one or more of the following optional features. In some examples, the method further includes, when the interfering transmitter is identified altering, by the data processing hardware, a transmission property of the interfering transmitter. The altered transmission property ceasing the interference between the two or more transmitters in the network. The transmission property may include a transmission frequency. In some examples, the interference isolation routine includes sequentially ceasing the transmitting operation of each transmitter in the group of transmitters, one at a time, to identify the interfering transmitter. The method may further include, for each transmitter having the ceased transmitting operation soliciting the interference assessment of the network while the transmitter has ceased the transmitting operation. When the interference assessment indicates cessation of the interference between the two or more transmitters in the network, the method includes determining that the interfering transmitter is the transmitter having the ceased transmitting operation. In addition, when the interference assessment indicates continuance of the interference between the two or more transmitters in the network, the method includes continuing to the next sequential transmitter in the group of transmitters. The method may further include ceasing the transmitting operations of the group of transmitters periodically or according to an on/off pattern. In other examples, the method includes randomly ceasing the transmitting operations of the group of transmitters for the threshold period of time.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
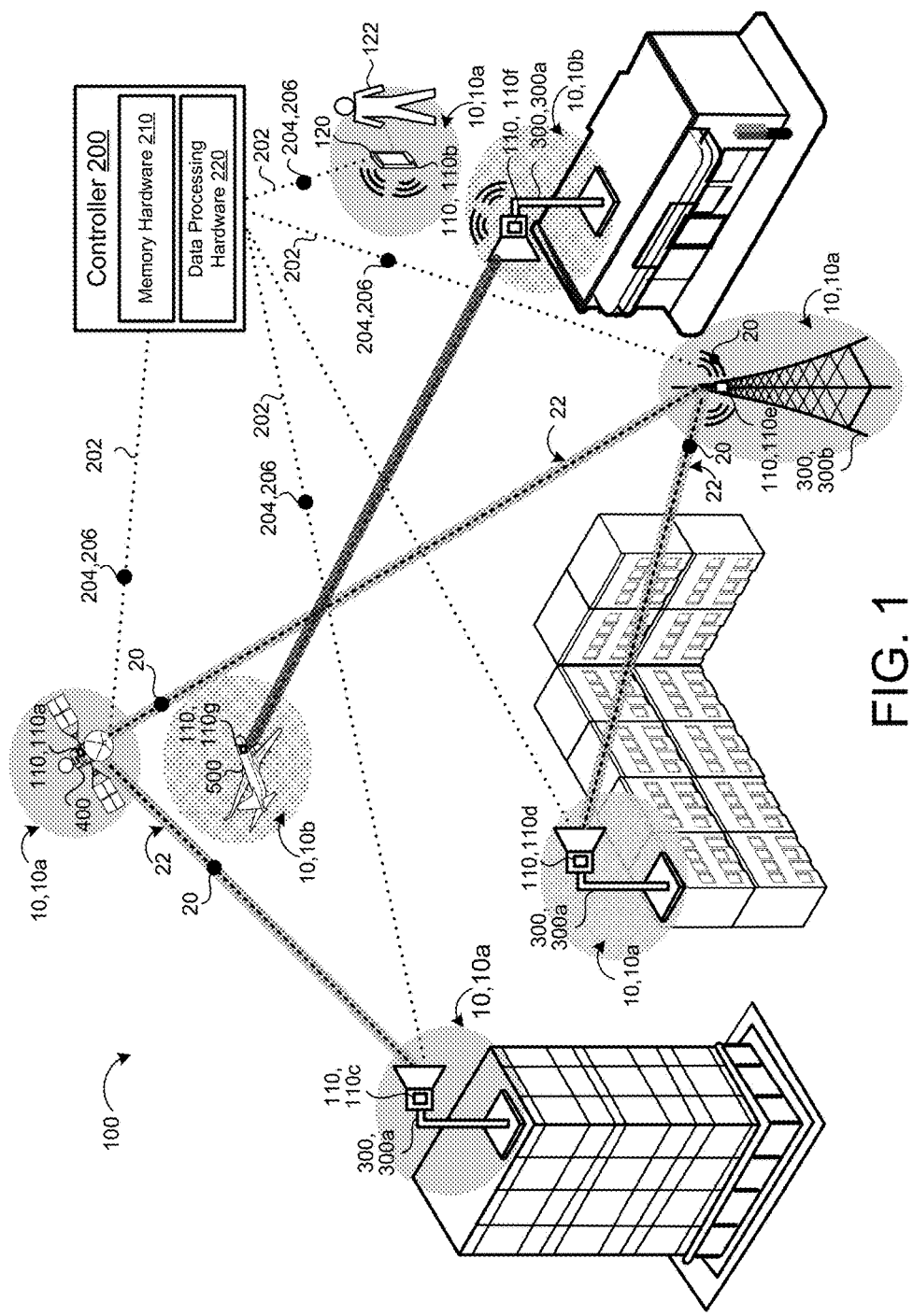
FIG. 1 is a schematic view of an exemplary communication system having one or more communication networks.
Figure 2:
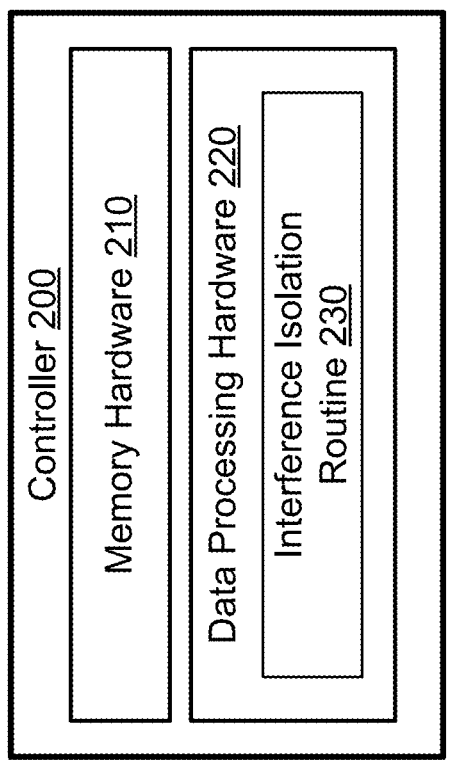
FIG. 2 is a schematic view of an exemplary controller associated with a network of the communication system of FIG. 1.

Referring to FIG. 1, in some implementations, a communication system 100 may include one or more networks 10, 10a, 10b, where each network 10 includes communication devices 110 associated with stationary communication terminals 300, satellites 400, and high-altitude platforms (HAP) 500. In some examples, an interfering communication device 110 is interfering with the transmission of a transmitting communication device 110 within the same or different network 10. Therefore, it is desirable to identify if the interfering communication device 110 is within the same network 10 as the transmitting communication device 110 or within a different network 10. When the interfering communication device 110 is within the same network 10 as the transmitting device 110, it is desirable to identify the interfering communication device 110 and adjust a transmission property of the interfering communication device 110. Moreover, identification of an interfering communication device allows a service, such as the CBRS, to manage and regulate usage of certain spectrum in licensed bands.

The network 10, 10a, 10b provides communication 20 between two communication devices 110 using radio signals. Radio communication uses radio waves to carry information, such as sound, by systematically modulating some property of electromagnetic energy waves transmitted through space. Some of these properties, include, but are not limited to, amplitude, frequency, phase, and/or pulse width. When radio waves strike an electrical conductor, the oscillating fields induce an alternating current in the conductor. As such, the information in the radio waves are extracted and transformed back into their original form. Radio systems need a communication device 110 that includes a transmitter to modulate or change some properties of the energy produced to impress a signal on it. The transmitter may use amplitude modulation or angle modulation, i.e., frequency modulation or phase modulation.

A radio spectrum is a part of the electromagnetic spectrum from 3 Hz to 3000 GHz (i.e., 3 THz). Electromagnetic waves in this frequency range are known as radio waves. Radio waves are widely used, specifically in telecommunication. The ITU allocates different parts of the radio spectrum for different radio transmission technologies and applications. For example, the ITU defines about 40 radio communication services. In some examples, parts of the radio spectrum are sold or licensed to private operators, such as cellular telephone operators or broadcast television stations. The Federal Communication Commission (FCC) decided to create the Citizen Broadband Radio Service (CBRS) in the 3.5 GHz band, making 150 MHz available for mobile broadband and other commercial services. The CBRS includes the band of spectrum from 3550 MHz to 3700 MHz. The users of the new band share the spectrum with themselves and incumbents through a three-tiered access model that depends on an automated frequency assignment and control database mechanism known as the Spectrum Access System (SAS).

In some examples, each network 10 of the communication system 100 communicates within a specific band. For example, a network 10 may communicate in the satellite band, and another network 10 may communicate using the CBRS band. As such, in some examples, a communication device 110, 110a-110e in a first network 10a interferes with a second communication device 110, 110f, 110g in a second network 10b. Therefore, in some examples, a controller 200 associated with a first network 10a and in communication with each communication device 110, 110a-110e of the first network 10a, determines if a communication device 110 is interfering within its network 10a. In addition, the controller 200 may identify the interfering communication device 110 within its network 10a, or identify that the interfering communication device 110 is outside its network 10a. Moreover, identification of interfering communication devices allows services to regulate usage of certain spectrum, such as the CBRS, in licensed bands.

The controller 200 is configured to determine an interfering communication device 110 (e.g., a transmitter) in a communication system 100 that has one or more networks 10, 10a, 10b. Each network 10, 10a, 10b uses a different radio band than the other network 10, 10a, 10b. In some examples, the communication system 100 includes more than one controller 200, each controller 200 is associated with one of the networks 10, 10a, 10b of the communication system 100 and configured to determine an interfering communication device 110 within or outside its associated network 10, 10a, 10b.

The controller 200 includes memory hardware 210 and data processing hardware 220. The memory hardware 210 is in communication with the data processing hardware 220 and stores instructions that when executed on the data processing hardware 220 cause the data processing hardware 220 to perform operations.

As shown in FIG. 1, a first network 10a includes communication devices 110, 110a-110e configured to communicate within the first network 10a. A second network 10b includes communication devices 110, 110f, 110g configured to communicate within the second network 10b. The first network 10a is configured to use a radio band that is different from a radio band used by the second network 10. The controller 200 is associated with the communication devices 110, 110a-110e of the first network 10a. As such, the controller 200 monitors the communication devices 110, 110a-110e of the first network 10a for an interference indication 204 from at least one of the communication devices 110, 110a-110e of the first network 10a via a monitoring channel 202. The interference indication 204 indicates interference between two or more communication devices 110 of the same or of a different network 10. As shown, the controller 200 is separate from the communication devices 110, 110a-110e of the first network 10a; however, in some examples, the controller 200 is part of one or more of the communication devices 110, 110a-110e of the first network 10a.

The controller 200 (i.e., the data processing hardware 220) receives an interference indication 204 from one of the communication devices 110, 110a-110e of the first network 10a or one of the communication devices 110, 110f, 110g of the second network 10b. Following, the controller 200 sends a command via the monitoring channel 202 to all or a group of communication devices 110, 110a-110e of the first network 10a to cease transmitting operations for a threshold period of time. After sending the command to cease transmitting operations for a threshold period of time, the controller 200 solicits an interference assessment 206 of the first network 10a for the threshold period of time when all of the communication devices 110, 110a-110e of the first network 10a ceased the transmitting operation. The interference assessment 206 from each one of the communication devices 110, 110a-110e within the first network 10a may indicate cessation of the interference between two or more communication devices 110, 110a-110e within the first network 10a. In some examples, the interference assessment 206 indicates continuance of the interference between two or more communication devices 110, 110a-110e of the first network 10a. When the interference assessment 206 indicates continuance of the interference between the two or more communication devices 110, 110a-110e in the first network 10a, the controller 200 determines that an interfering communication device 110a resides outside of the first network 10a. However, when the interfering assessment indicates cessation of the interference between the two or more communication devices 110, 110a-110e, the controller 200 determines that the interfering communication device 110 resides inside or is part of the first network 10a. In addition, the controller 200 executes an interference isolation routine 230 to isolate and identify the communication devices 110, 110a-110e causing the interference. The interference isolation routine 230 is configured to identify the interfering communication device 110 that resides inside the first network 10a.

In some examples, when executing the interference isolation routine 230, the controller 200 sends a signal to the communication devices 110, 110a-110e within the first network 10a to sequentially cease any transmitting operations of each communication devices 110, 110a-110e in the first network 10a, one at a time, to identify the interfering communication devices 110, 110a-110e. For example, if the first network 10a includes five communication devices 110, 110a-110e, then the controller 200 sends a signal via the monitoring channel 202 sequentially to each one of the five communication devices 110, 110a-110e within the first network 10a to cease their respective transmitting operation, one at a time. As such, the controller 200 identifies that a communication devices 110, 110a-110e is the interfering communication device 110 when interference stops when that communication device 110, 110a-110e has ceased the transmitting operation. Additionally, in some examples, for each communication device 110, 110a-110e having ceased transmitting operations, the controller 200 solicits the interference assessment 206 of the first network 10a while the communication devices 110, 110a-110e has ceased the transmitting operation. Furthermore, when the interference assessment 206 indicates cessation of the interference between the two or more communication devices 110, 110a-110e in the first network 10a, the controller 200 determines that the interfering communication devices 110, 110a-110e is the communication device 110 having ceased the transmitting operations. However, when the interference assessment 206 indicates continuance of the interference between two or more communication devices 110 in the first network 10a, the controller 200 continues to the next sequential communication device 110 in the first network 10a.

In some implementations, when executing the interference isolation routine 230, the controller 200 sends a signal via the monitoring channels 202 to a collection of communication devices 110 to cease the transmitting operation of the collection of communication devices 110 of the first network 10a. In addition, the controller 200 solicits the interference assessment 206 of the first network 10a while the collection of communication devices 110 has ceased the transmitting operations. As such, when the interference assessment 206 indicates cessation of the interference between the two or more communication devices 110, 110a-110e in the first network 10a, the controller 200 determines that the interfering communication device 110 is one of the communication devices 110 having the ceased transmitting operation. Therefore, the controller 200 continues the recursive operation on a subset of the collection of the communication devices 110 in the first network 10a until the interfering communication device 110 is identified. In some examples, when the interference assessment indicates continuance of the interference between the two or more communication devices 110 in the first network 10a, the controller 200 continues the recursive operation on another collection of communication devices 110 in the first network 10a that includes different communication devices 110 than the first collection of communication devices 110. As such, the controller 200 continues the recursive operation on collections of communication devices 110 until a collection of communication devices 110 is identified.

In some implementations, the controller 200 sends a signal to the interfering communication device 110, 110a-110e within the first network 10a for altering a transmission property of the transmitted signal. The altered transmission property ceases the interference between the two or more communication devices 110 within the first network 10a. The signal property may include, but is not limited to, a signal frequency, a signal amplitude, a signal phase, and/or a signal pulse width.

In some examples, the controller 200 sends the communication devices of the first networks 10a a command via the monitoring channel 202 to cease the transmitting operations of the communication devices periodically (e.g., every predefined time period) or according to an on/off pattern. In other examples, the controller 200 sends a command to the communication devices of the first networks 10a via the monitoring channel 202 to randomly cease the transmitting operations of all the communication devices 110 in the network for a threshold period of time. As such, during the time that the communication devices 110 have ceased, the controller 200 determines if the interfering communication device 110 is within the first network 10a or outside of the first network 10a. For example, when all of the communication devices 110 have ceased the transmission operations, and the controller 200 receives an interference assessment 206 indicating cessation of the interference between two or more communication devices 110, the controller 200 determines that the interference is within the first network 10a. However, if the controller 200 received an interference assessment 206 indicating continuance of the interference, then the controller 200 determines that the interference resides within the network 10a. As such, the controller 200 can then execute the isolation routine 230 to determine which communication device 110 is causing the interference.

In some examples, the controller 200 sends a command to each communication device 110 in the first network 10a associated with the controller 200 to transmit a corresponding sequence for a threshold period of time. In other words, the controller 200 sequentially sends a command to each one of communication devices 110 for the threshold of time to transmit a corresponding sequence. The corresponding sequence of each communication device 110 may be unique to the corresponding communication device 110. In other examples, the corresponding sequence of each communication device 110 of the full or a portion of a corresponding transmitted bandwidth. For each one of the communication devices 110, the controller 200 may then determine whether a frequency offset of the interference between the two or more communication devices in the first network 10a correspond to the communication device 110 that is transmitting the frequency offset. Therefore, when the frequency offset of the interference between the two or more communication devices in the first network 10a correspond to the communication device 110, the controller 200 sends a command to the communication device 110 to alter a transmission property of the communication device, which leads to ceasing the interference between the communication devices 110.

As previously described, the communication system 100 includes communication devices 110 associated with stationary communication terminals 300, satellites 400, and high-altitude platforms (HAP) 500. The stationary communication terminals 300 may communicate with one another or with the satellites 400, by way of the communication device 110 associated with each one of the stationary terminal 300, the satellite 400, and the HAP 500. The stationary communication terminals 300 may be building stationary terminals 300a located on the rooftop of buildings or ground stationary terminal 300b located on the ground. The stationary communication terminals 300 may receive a communication 20 from another stationary terminal 300, a satellite 400, or a HAP 500, and reroute the communication 20 to another stationary terminal 300, a satellite 400, or a HAP 500, or in some examples, to one or more user devices 120, each associated with a user 122. The satellite 400 may be in Low Earth Orbit (LEO), Medium Earth Orbit (MEO), or High Earth Orbit (HEO), including Geosynchronous Earth Orbit (GEO). The communication system 100 may also include HAPs 500 that operate at high altitudes (e.g., 17-22 km). For instance, HAPs 500 may be released into the earth's atmosphere, e.g., by an aircraft, or flown to the desired altitude. The global-scale communication system 100 transmits a communication 20 wirelessly between two communication terminals 300, 400, 500.

Figure 3B:
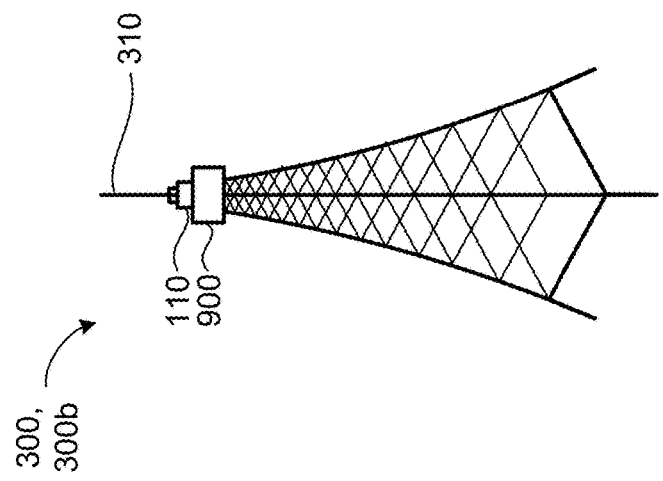
FIGS. 3A and 3B are perspective views of exemplary stationary communication terminals that include a communication device communicating using radio signals.
Figure 3A:
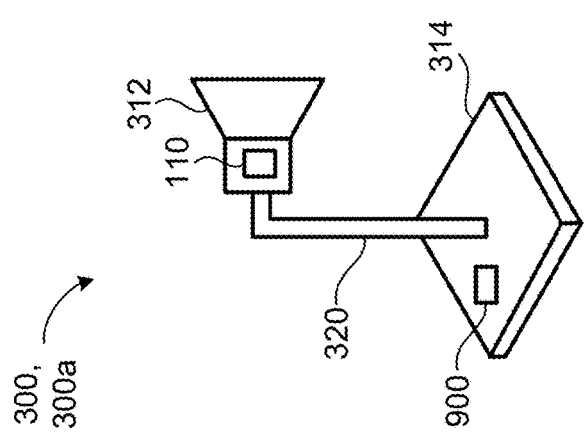

FIG. 3A illustrates an example building stationary terminal 300a that includes a base 314 and a reflector 312 supported by the base 314. The building stationary terminal 300a also includes the communication device 110, and control hardware 900 in communication with the communication device 110. In some examples, the control hardware 900 is associated with pointing steering hardware (e.g., a gimbal) for adjusting the reflector 312 to point toward the other communication device 110. The base 314 may mount the building stationary terminal 300a on a building.

FIG. 3B illustrates an example ground stationary terminal 300b that also includes the communication device 110 and control hardware 900. The control hardware 900 of the ground stationary terminal 300b may also adjust the reflector 312 to establish communication with the other terminals 300, 400, 500 based on a signal strength of the received radio signal received from the other communication device 110.

Figure 4:
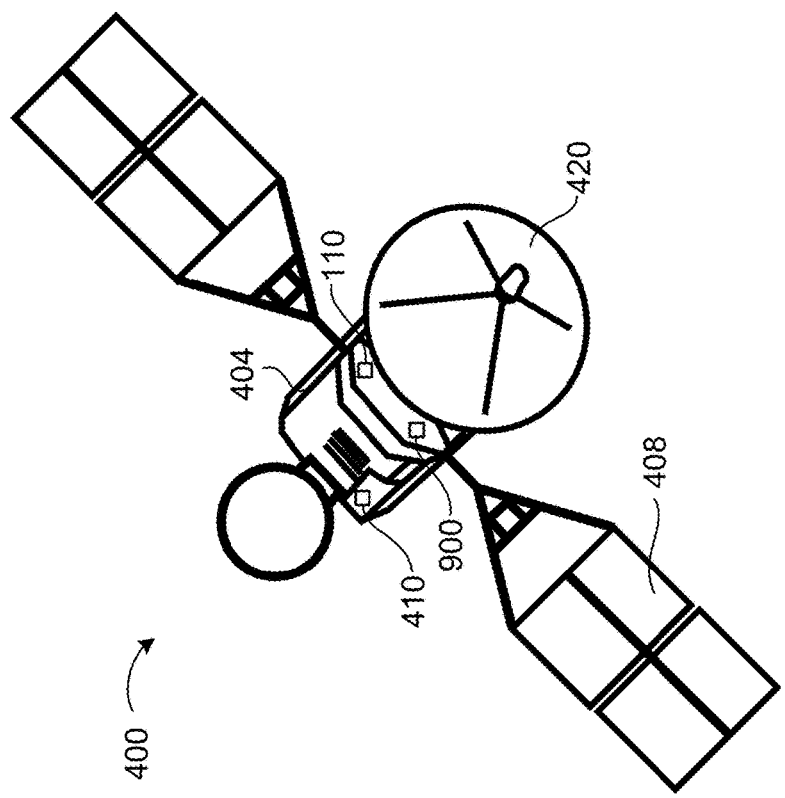
FIG. 4 is a perspective view of exemplary satellite that includes a communication device communicating using radio signals.

Referring to FIG. 4, a satellite 400 is an object placed into orbit around the earth and may serve different purposes, such as military or civilian observation satellites, communication satellites, navigations satellites, weather satellites, and research satellites. The orbit of the satellite 400 varies depending in part on the purpose of the satellite 400. Satellite orbits may be classified based on their altitude from the surface of the earth as Low Earth Orbit (LEO), Medium Earth Orbit (MEO), and High Earth Orbit (HEO). LEO is a geocentric orbit (i.e., orbiting around the earth) that ranges in altitude from zero to 1,240 miles. MEO is also a geocentric orbit that ranges in altitude from 1,200 mile to 22,236 miles. HEO is also a geocentric orbit and has an altitude above 22,236 miles. Geosynchronous Earth Orbit (GEO) is a special case of HEO. Geostationary Earth Orbit (GSO, although sometimes also called GEO) is a special case of Geosynchronous Earth Orbit. Satellites 400 placed in the GEO orbit can "stand still" with respect to a certain location on earth. Thus, a person on earth looking at a satellite 400 in the GEO orbit would perceive that the satellite 400 is not moving. Therefore, the satellites 400 in GEO orbit maintain a position with respect to a location on earth. Thus, a stationary terminal 300 communicating with a satellite 400 in the GEO orbit does not need to keep tracking the satellite 400 as it moves, it only needs to point to a direction of the satellite 400 in its stationary position with respect to the stationary terminal 300.

In some implementations, the satellite 400 includes a satellite body 404 having a payload that includes a communication device 110. The communication device 110 of the satellite 400 receives the communication 20 from another communication terminal 110, a satellite 400, or a HAP 500 and transmits the communication 20 to another communication terminal 300, satellite 400, or HAP 500.

The satellite 400 also includes control hardware 900 that processes the received communication 20 and establishes acquisition and tracking with other communication terminals 110, satellites 400, or HAPs 500. In some examples, the control hardware 900 executes algorithms to determine where the satellite 400 is heading. The satellite 400 also includes an antenna 420 for receiving and transmitting the communication 20. The satellite 400 includes solar panels 408 mounted on the satellite body 404 for providing power to the satellite 400. In some examples, the satellite 400 includes rechargeable batteries used when sunlight is not reaching and charging the solar panels 408.

In some examples, the satellite 400 includes batteries 410 to operate the satellite 400 when the solar panels 408 of the satellite 400 are hidden from the sun due to the earth, the moon, or any other objects. In some examples, the satellite 400 also includes a reaction control system (RCS) that uses thrusters to adjust the altitude and translation of the satellite 400 making sure that the satellite 400 stays in its orbit. The RCS may provide small amounts of thrusts in one or more directions and torque to allow control of the rotation of the satellite 400 (i.e., roll, pitch, and yaw).

In some implementations, the satellite 400 includes tracking, telemetry, command and ranging (TT&R) that provides a connection between the satellite 400 and stationary terminals 300, other satellites 400, or the HAPs 500. The TT&R ensures that the satellite 400 establishes communication or a link 22 to successfully receive/transmit a communication 20. The TT&R performs several operations, including, but not limited to, monitoring the health and status of the satellite 400. Another operation includes determining the satellite's exact location by way of receiving, processing, and transmitting of communications 20. Yet another operation of the TT&R includes properly controlling the satellite 400 through the receiving, processing, and implementing of commands transmitted from the stationary terminals 300. In some examples, a ground operator controls the satellite 400; however, such an intervention by the operator is only minimal or in case of an emergency and the satellite 400 is mostly autonomous.

Figure 5B:
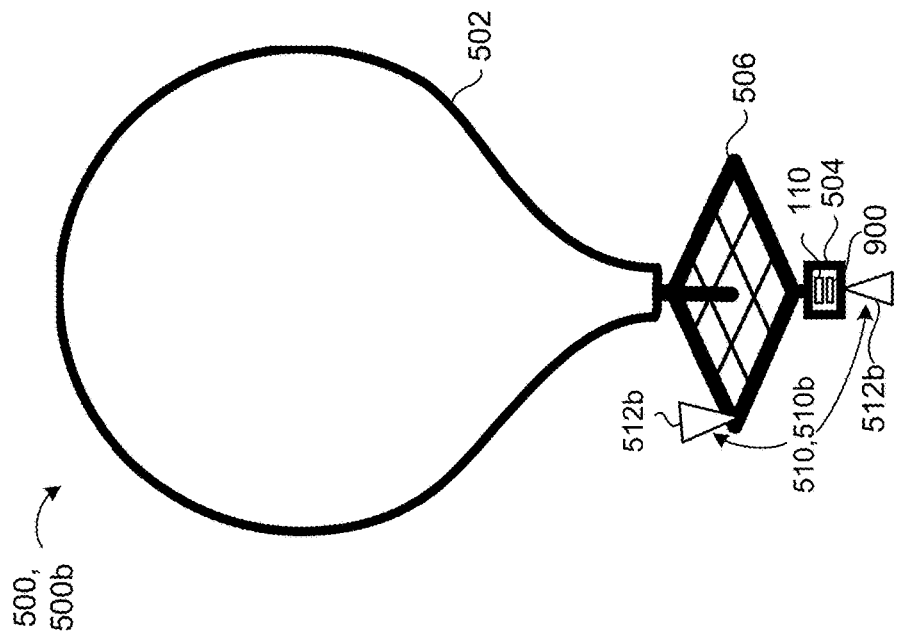
FIG. 5B is a perspective view of an exemplary high-altitude balloon that includes a communication device communicating using radio signals.
Figure 5A:
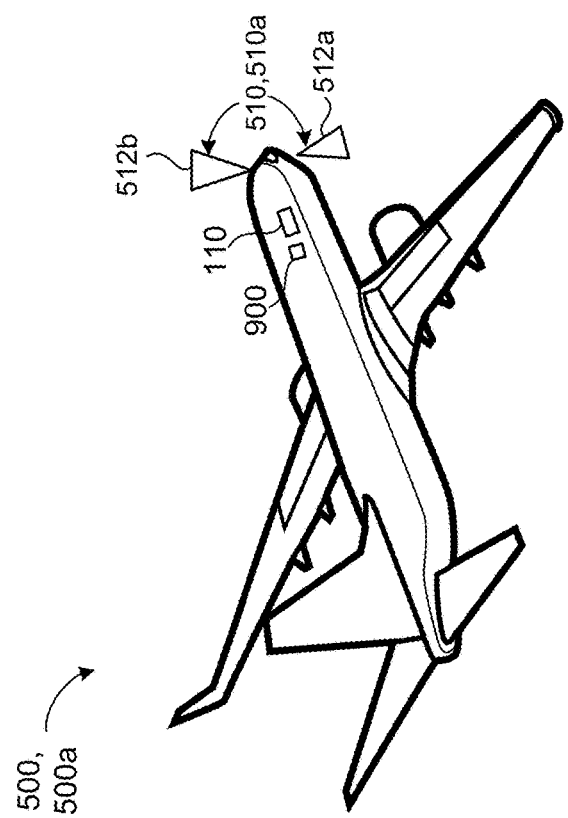
FIG. 5A is a perspective view of an exemplary aircraft that includes a communication device communicating using radio signals.

Referring to FIGS. 5A and 5B, in some implementations, the HAP 500, 500a, 500b includes the communication device 110. The communication device 110 of the HAP 500 receives the communication 20 from another communication terminal 110, a satellite 400, or a HAP 500 and transmits the communication 20 to another communication terminal 110, satellite 400, or HAP 500. The HAP 500 may include control hardware 900 that processes the received communication 20 and establishes acquisition and tracking with the other communication terminal 110, satellite 400, or HAP 500. The HAP 500, 500a, 500b includes an antenna system 510, 510a, 510b that receives/transmits a communication 20. The antenna system 510 may include a first antenna 512a that receives/transmits a communication 20 from the ground terminal 300, and a second antenna 512b that receives/transmits a communication from a satellite 400. The HAP 500, 500a, 500b includes the communication device 110. In some examples, and as previously discussed, the satellite 400 and/or the HAP 500 is moving; therefore, the antenna system 310 of the HAP 500 needs to track a position of one or more satellites 400 to maintain a communication link 22 between the HAP 500 and the satellite 400.

FIG. 5A illustrates an example aircraft 500a, such as an unmanned aerial vehicle (UAV). A UAV, also known as a drone, is an aircraft without a human pilot onboard. There are two types of UAVs, autonomous aircrafts and remotely piloted aircraft. As the name suggests, autonomous aircrafts are designed to autonomously fly, while remotely piloted aircrafts are in communication with a pilot who pilots the aircraft. In some examples, the aircraft 500a is remotely piloted and autonomous at the same time. The UAV usually includes wings to maintain stability, a GPS system to guide it through its autonomous piloting, and a power source (e.g., internal combustion engine or electric battery) to maintain long hours of flight. In some examples, the UAV is designed to maximize efficiency and reduce drag during flight. Other UAV designs may be used as well.

FIG. 5B illustrates an example communication balloon 500b that includes a balloon 502 (e.g., sized about 49 feet in width and 39 feet in height and filled with helium or hydrogen), an equipment box 504, and solar panels 408. The equipment box 504 includes the control hardware 900 that processes the received communication 20 and establishes acquisition and tracking with the other communication terminal 110, satellite 400, or HAP 500. In some examples, the control hardware executes algorithms to determine where the high-altitude balloon 500b needs to go, then each high-altitude balloon 500b moves into a layer of wind blowing in a direction that may take it where it should be going. The equipment box 504 also includes batteries to store power and the transceiver 320 to communicate with other devices (e.g., stationary terminals 300, satellites 400, and other HAPs 500). The solar panels 506 may power the equipment box 504.

Communication balloons 500b are typically released in to the earth's stratosphere to attain an altitude between 11 to 23 miles and provide connectivity for a ground area of 25 miles in diameter at speeds comparable to terrestrial wireless data services (such as, 3G or 4G). The communication balloons 500b float in the stratosphere, at an altitude twice as high as airplanes and the weather (e.g., 20 km above the earth's surface). The communication balloons 500b are carried around the earth by winds and can be steered by rising or descending to an altitude with winds moving in the desired direction. Winds in the stratosphere are usually steady and move slowly at about 5 and 20 mph, and each layer of wind varies in direction and magnitude.

Figure 6:
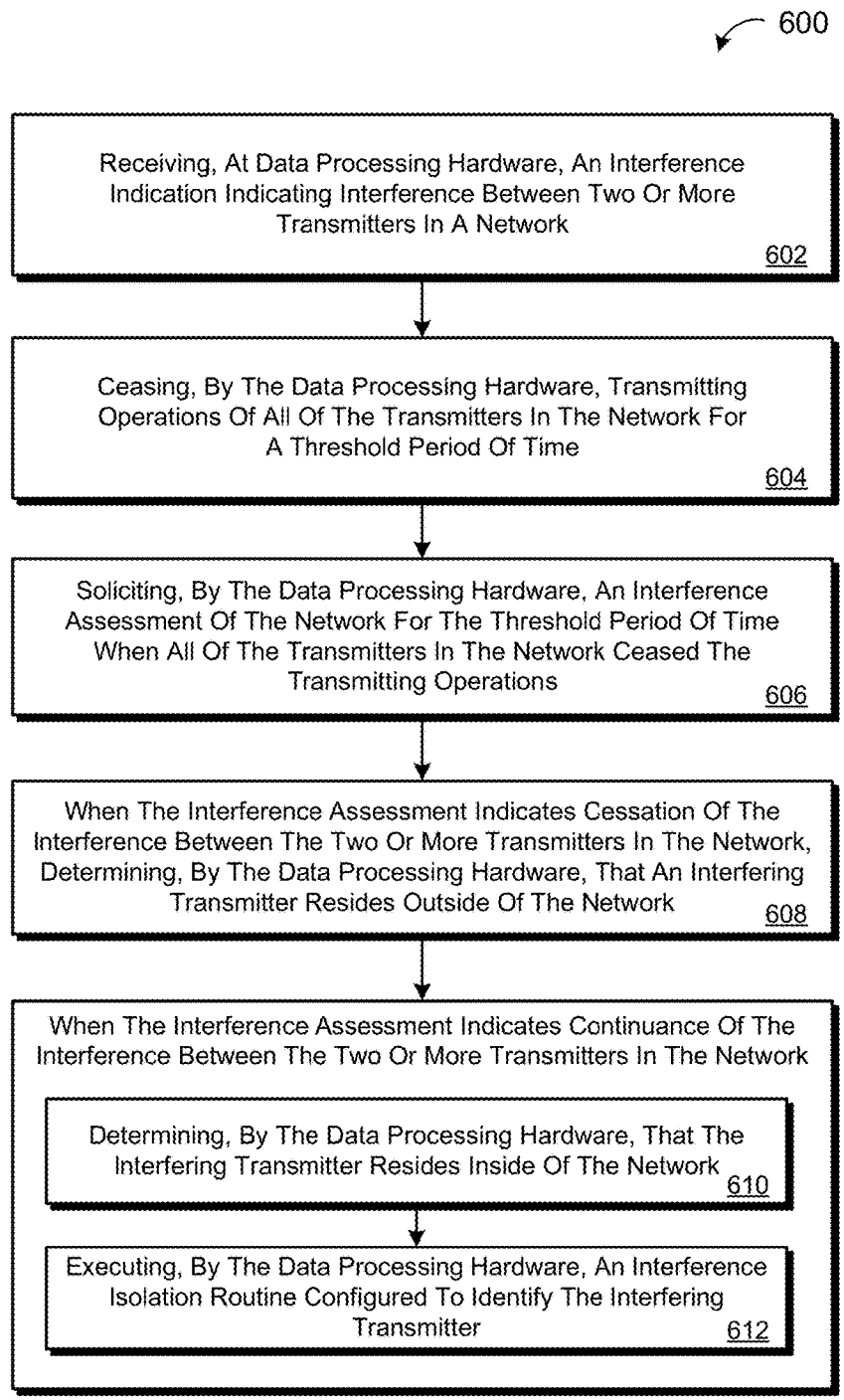
FIG. 6 is a schematic view of an exemplary arrangement of operations for identifying an interfering transmitter.

FIG. 6 illustrates a method 600 for identifying an interfering transmitter (e.g., communication device 110) in a network 10. At block 602, the method 600 includes receiving, at data processing hardware 220, an interference indication 204 indicating interference between two or more transmitters 110 in the network 10. At block 604, the method 600 includes ceasing, by the data processing hardware 220, transmitting operations of all of the transmitters 110 in the network 10 for a threshold period of time. At block 606, the method 600 includes soliciting, by the data processing hardware 220, an interference assessment of the network 10 for the threshold period of time when all of the transmitters 110 in the network 10 ceased the transmitting operations. At block 608, when the interference assessment 206 indicates continuance of the interference between the two or more transmitters 110 in the network 10, the method 600 includes determining, by the data processing hardware 220 that an interfering transmitter 110 resides outside of the network 10. When the interference assessment indicates cessation of the interference between the two or more transmitters 110 in the network 10, at block 610 the method 600 includes determining, by the data processing hardware 220, that the interfering transmitter 110 resides inside of the network 10; and at block 612, executing, by the data processing hardware 220, an interference isolation routine configured to identify the interfering transmitter 110.

In some implementations, when the interfering transmitter 110 is identified, the method 600 further includes, altering, by the data processing hardware 220, a transmission property of the interfering transmitter. The altered transmission property ceases the interference between the two or more transmitters 110 in the network 10. The transmission property may include a transmission frequency.

In some implementations, the interference isolation routine includes sequentially ceasing the transmitting operation of each transmitter 110 in the network 10, one at a time, to identify the interfering transmitter. For each transmitter 110 having the ceased transmitting operation, the method 600 may include soliciting the interference assessment of the network 10 while the transmitter 110 has ceased the transmitting operation. In addition, for each transmitter 110 having the ceased transmitting operation, when the interference assessment indicates cessation of the interference between the two or more transmitters 110 in the network 10, the method 600 may also include determining that the interfering transmitter 110 is the transmitter 110 having the ceased transmitting operation. Moreover, for each transmitter 110 having the cessation of the interference between the two or more transmitters 110 in the network 10, when the interference assessment indicates continuance of the interference between the two or more transmitters 110 in the network 10, the method 600 may also include continuing to the next sequential transmitter 110 in the network 10.

In some examples, the interference isolation routine includes a recursive operation. The recursive operation includes: ceasing the transmitting operations of a collection of transmitters 110 in the network 10; and soliciting the interference assessment of the network 10 while the collection of transmitters 110 have ceased the transmitting operations. When the interference assessment indicates cessation of the interference between the two or more transmitters 110 in the network 10, the recursive operation includes: determining that the interfering transmitter 110 is one of the collection of transmitters 110 having the ceased transmitting operations; and continuing the recursive operation on a subset of the collection of transmitters 110 in the network 10. In addition, when the interference assessment indicates continuance of the interference between the two or more transmitters 110 in the network 10, the method 600 may include continuing the recursive operation on another collection of transmitters 110 in the network 10.

In some implementations, the method 600 includes ceasing the transmitting operations of all of the transmitters 110 in the network 10 periodically or according to an on/off pattern. In some examples, the method 600 includes randomly ceasing the transmitting operations of all of the transmitters 110 in the network 10 for the threshold period of time.

Figure 7:
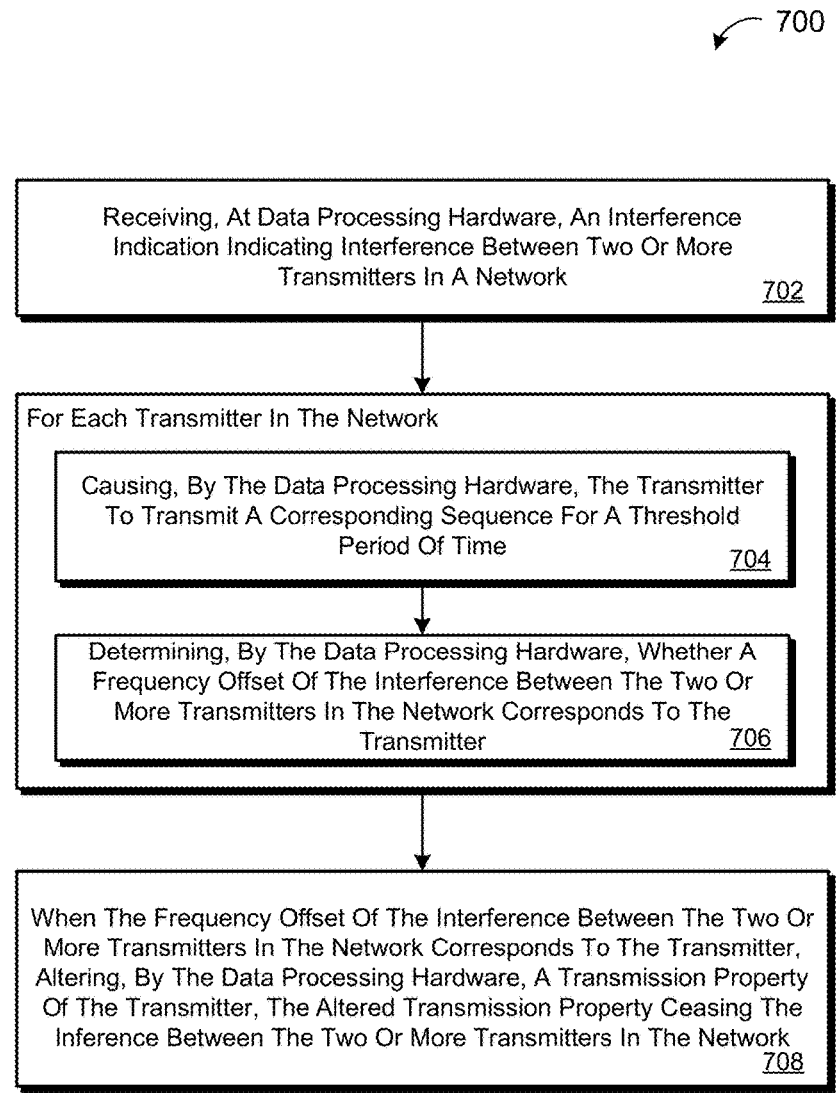
FIG. 7 is a schematic view of an exemplary arrangement of operations for identifying an interfering transmitter.

FIG. 7 illustrates a method 700 for determining an interfering transmitter 110 in a network 10 having multiple transmitters 110. At block 702, the method 700 includes receiving, at data processing hardware 220, an interference indication 204 indicating interference between two or more transmitters 110 in a network 10. For each transmitter 110 in the network 10, at block 704, the method 700 includes causing, by the data processing hardware 220, the transmitter 110 to transmit a corresponding sequence for a threshold period of time, and at block 706, determining, by the data processing hardware 220, whether a frequency offset of the interference between the two or more transmitters 110 in the network 10 corresponds to the transmitter. At block 708, when the frequency offset of the interference between the two or more transmitters 110 in the network 10 corresponds to the transmitter, the method 700 includes altering, by the data processing hardware 220, a transmission property of the transmitter 110. The altered transmission property ceasing the interference between the two or more transmitters 110 in the network 10.

In some examples, the corresponding sequence of each transmitter 110 is unique to the corresponding transmitter. In other examples, the corresponding sequence of each transmitter 110 occupies a full corresponding transmitted bandwidth. The corresponding sequence of each transmitter 110 may occupy a portion of a corresponding transmitted bandwidth.

Figure 8:
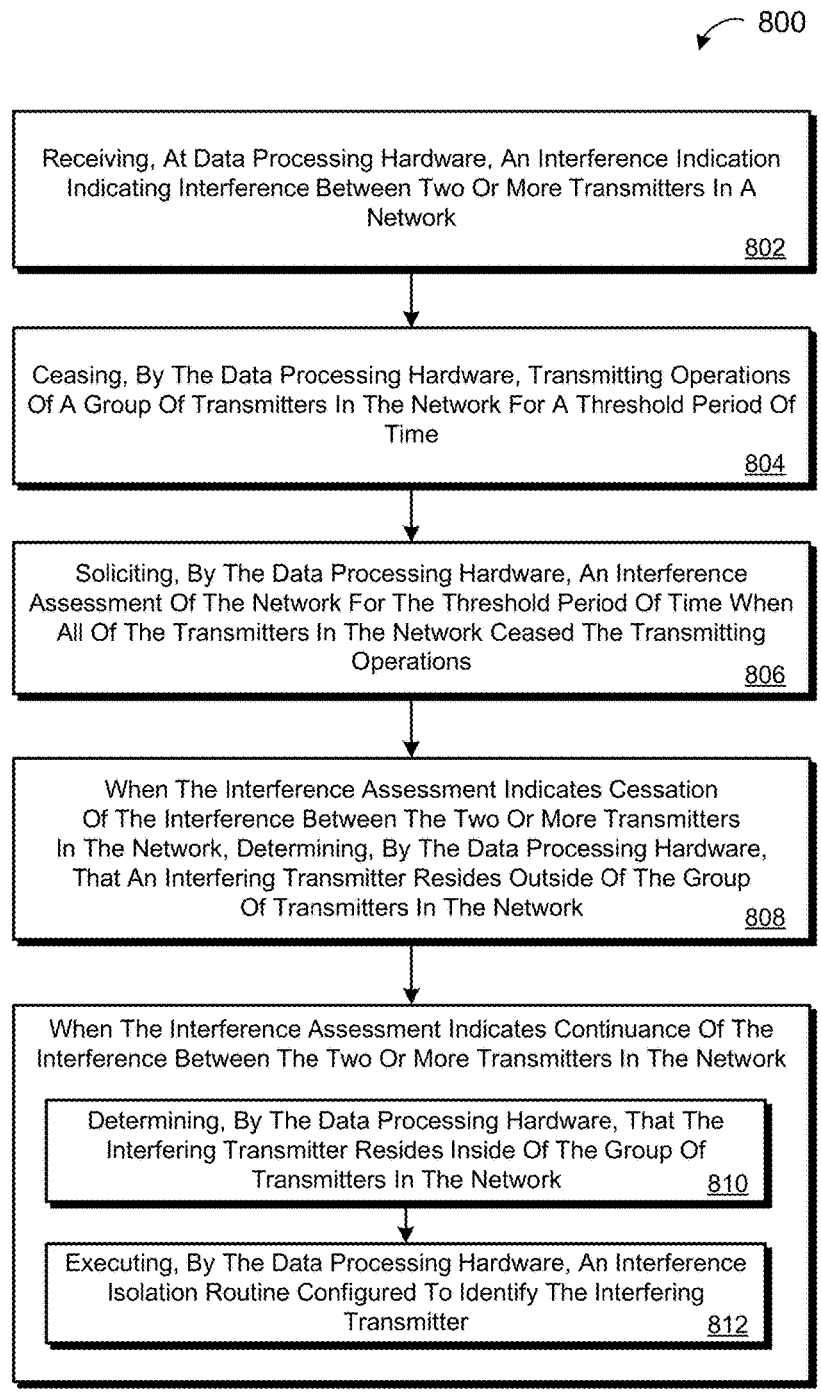
FIG. 8 is a schematic view of an exemplary arrangement of operations for identifying an interfering transmitter.

FIG. 8 illustrates a method 800 for determining an interfering transmitter 110 in a network 10 having multiple transmitters 110. At block 802, the method 800 includes receiving, at data processing hardware 220, an interference indication 204 indicating interference between two or more transmitters 110 in a network 10, and at block 804, ceasing, by the data processing hardware 220, transmitting operations of a group of transmitters 110 in the network 10 for a threshold period of time. At block 806, the method 800 may also include soliciting, by the data processing hardware 220, an interference assessment of the network 10 for the threshold period of time when all of the transmitters 110 in the network 10 ceased the transmitting operations. At block 808, when the interference assessment indicates continuance of the interference between the two or more transmitters 110 in the network 10, the method 800 includes determining, by the data processing hardware 220, that an interfering transmitter 110 resides outside of the group of transmitters 110 in the network 10. When the interference assessment indicates cessation of the interference between the two or more transmitters 110 in the network 10, at block 810, the method 800 includes determining, by the data processing hardware 220, that the interfering transmitter 110 resides inside of the group of transmitters 110 in the network 10 and at block 812, executing, by the data processing hardware, an interference isolation routine configured to identify the interfering transmitter.

In some examples, the method 800 further includes, when the interfering transmitter 110 is identified altering, by the data processing hardware 220, a transmission property of the interfering transmitter. The altered transmission property ceasing the interference between the two or more transmitters 110 in the network 10. The transmission property may include a transmission frequency. In some examples, the interference isolation routine includes sequentially ceasing the transmitting operation of each transmitter 110 in the group of transmitters 110, one at a time, to identify the interfering transmitter. The method 800 may further include, for each transmitter 110 having the ceased transmitting operation soliciting the interference assessment of the network 10 while the transmitter 110 has ceased the transmitting operation. When the interference assessment indicates cessation of the interference between the two or more transmitters 110 in the network 10, the method 800 includes determining that the interfering transmitter 110 is the transmitter 110 having the ceased transmitting operation. In addition, when the interference assessment indicates continuance of the interference between the two or more transmitters 110 in the network 10, the method 800 includes continuing to the next sequential transmitter 110 in the group of transmitters 110. The method 800 may further include ceasing the transmitting operations of the group of transmitters 110 periodically or according to an on/off pattern. In other examples, the method 800 includes randomly ceasing the transmitting operations of the group of transmitters 110 for the threshold period of time.

The details of one or more implementations of the disclosure are set forth in the accompanying drawings and the description below. Other aspects, features, and advantages will be apparent from the description and drawings, and from the claims.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 9:
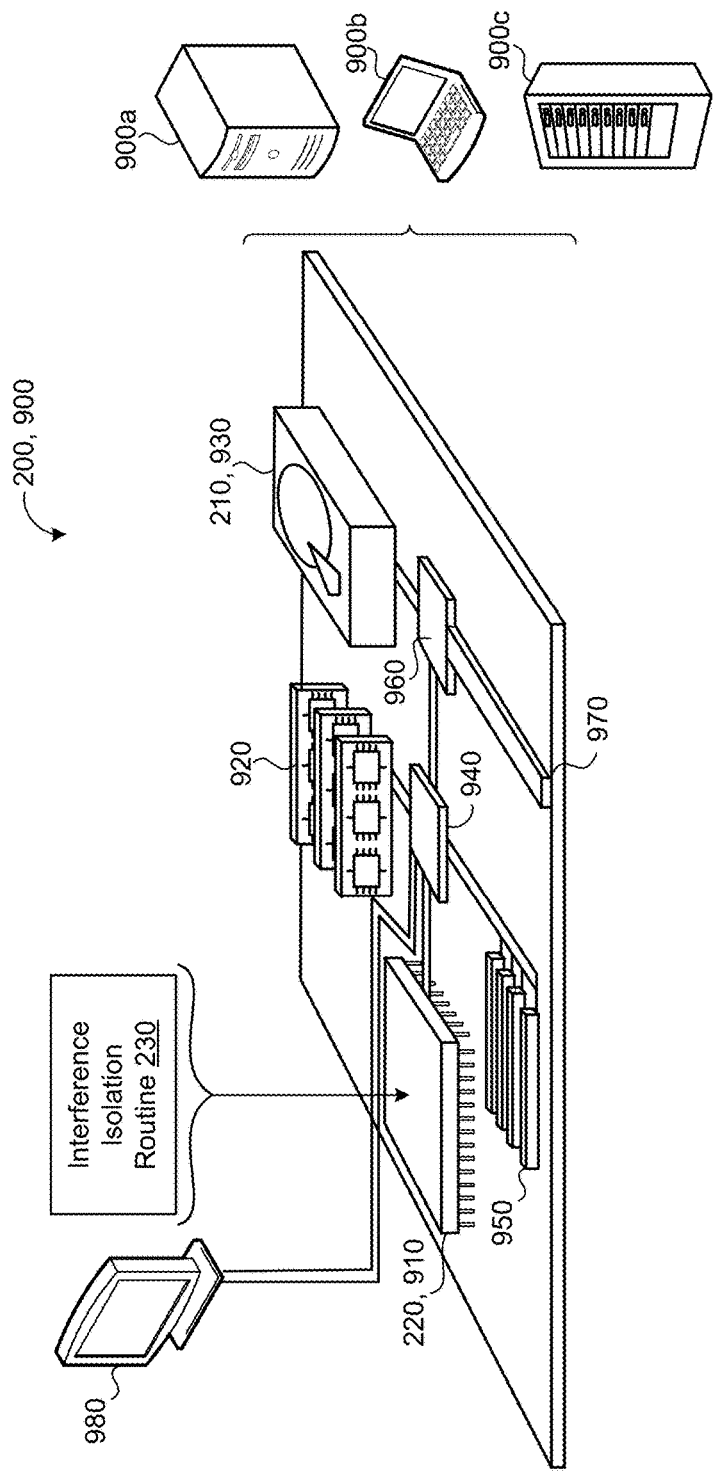
FIG. 9 is a schematic view of an exemplary computing device executing any systems or methods described herein.

FIG. 9 is schematic view of an example computing device 200, 900 that may be used to implement the systems and methods described in this document. The computing device 200,900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 900 includes a processor 910, memory 920, a storage device 930, a high-speed interface/controller 940 connecting to the memory 920 and high-speed expansion ports 950, and a low speed interface/controller 960 connecting to low speed bus 970 and storage device 930. Each of the components 910, 920, 930, 940, 950, and 960, are interconnected using various busses, and may be mounted on a common motherboard or in other manners as appropriate. The processor 910 can process instructions for execution within the computing device 900, including instructions stored in the memory 920 or on the storage device 930 to display graphical information for a graphical user interface (GUI) on an external input/output device, such as display 980 coupled to high speed interface 940. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 920 stores information non-transitorily within the computing device 900. The memory 920 may be a computer-readable medium, a volatile memory unit(s), or non-volatile memory unit(s). The non-transitory memory 920 may be physical devices used to store programs (e.g., sequences of instructions) or data (e.g., program state information) on a temporary or permanent basis for use by the computing device 900. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 930 is capable of providing mass storage for the computing device 900. In some implementations, the storage device 930 is a computer-readable medium. In various different implementations, the storage device 930 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 920, the storage device 930, or memory on processor 910.

The high speed controller 940 manages bandwidth-intensive operations for the computing device 900, while the low speed controller 960 manages lower bandwidth-intensive operations. Such allocation of duties is exemplary only. In some implementations, the high-speed controller 940 is coupled to the memory 920, the display 980 (e.g., through a graphics processor or accelerator), and to the high-speed expansion ports 950, which may accept various expansion cards (not shown). In some implementations, the low-speed controller 960 is coupled to the storage device 930 and low-speed expansion port 970. The low-speed expansion port 970, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 900 may be implemented in a number of different forms, as shown in the figure. For example, it may be implemented as a standard server 900a or multiple times in a group of such servers 900a, as a laptop computer 900b, or as part of a rack server system 900c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at data processing hardware, an interference indication from at least one transmitter in a network, the interference indication indicating interference between two or more transmitters in the network;
   when the interference condition is received, sending a command from the data processing hardware to all of the transmitters in the network, the command when received by each transmitter in the network, causing each corresponding transmitter in the network to cease transmitting operations for a threshold period of time;
   soliciting, by the data processing hardware, an interference assessment from each one of the transmitters in the network for the threshold period of time when all of the transmitters in the network ceased the transmitting operations; and
   when the interference assessment indicates cessation of the interference between the two or more transmitters in the network:
   determining, by the data processing hardware, that the interfering transmitter resides inside of the network; and
   executing, by the data processing hardware, an interference isolation routine configured to identify the interfering transmitter.

2. The method of claim 1, further comprising when the interfering transmitter is identified, altering, by the data processing hardware, a transmission property of the interfering transmitter, the altered transmission property ceasing the interference between the two or more transmitters in the network.

3. The method of claim 2, wherein the transmission property comprises a transmission frequency.

4. The method of claim 1, wherein the interference isolation routine comprises sequentially ceasing the transmitting operation of each transmitter in the network, one at a time, to identify the interfering transmitter.

5. The method of claim 4, further comprising, for each transmitter having the ceased transmitting operation:
   soliciting the interference assessment of the network while the transmitter has ceased the transmitting operation;
   when the interference assessment indicates cessation of the interference between the two or more transmitters in the network, determining that the interfering transmitter is the transmitter having the ceased transmitting operation; and
   when the interference assessment indicates continuance of the interference between the two or more transmitters in the network, continuing to the next sequential transmitter in the network.

6. The method of claim 1, wherein the interference isolation routine comprises a recursive operation comprising:
- ceasing the transmitting operations of a collection of transmitters in the network;
- soliciting the interference assessment of the network while the collection of transmitters has ceased the transmitting operations;
- when the interference assessment indicates cessation of the interference between the two or more transmitters in the network:
  - determining that the interfering transmitter is one of the transmitters having the ceased transmitting operations; and
  - continuing the recursive operation on a subset of the collection of transmitters in the network; and
- when the interference assessment indicates continuance of the interference between the two or more transmitters in the network, continuing the recursive operation on another collection of transmitters in the network.

7. The method of claim 1, further comprising ceasing the transmitting operations of all of the transmitters in the network periodically or according to an on/off pattern.

8. The method of claim 1, further comprising randomly ceasing the transmitting operations of all of the transmitters in the network for the threshold period of time.

9. A system comprising:
- data processing hardware; and
- memory hardware in communication with the data processing hardware, the memory hardware storing instructions that when executed on the data processing hardware cause the data processing hardware to perform operations comprising:
  - receiving an interference indication from at least one transmitter in a network, the interference indication indicating interference between two or more transmitters in the network;
  - when the interference condition is received, sending a command from from the data processing hardware to all of the transmitters in the network, the command when received by each transmitter in the network, causing each corresponding transmitter in the network to cease transmitting operations for a threshold period of time;
  - soliciting an interference assessment from each one of the transmitters in the network for the threshold period of time when all of the transmitters in the network ceased the transmitting operations; and
  - when the interference assessment indicates cessation of the interference between the two or more transmitters in the network:
    - determining that the interfering transmitter resides inside of the network; and
    - executing an interference isolation routine configured to identify the interfering transmitter resides inside of the network.

10. The system of claim 9, wherein the operations further comprise altering a transmission property of the interfering transmitter, the altered transmission property ceasing the interference between the two or more transmitters in the network.

11. The system of claim 10, wherein the transmission property comprises a transmission frequency.

12. The system of claim 9, wherein the interference isolation routine comprises sequentially ceasing the transmitting operation of each transmitter in the network, one at a time, to identify the interfering transmitter.

13. The system of claim 12, wherein the operations further comprise, for each transmitter having the ceased transmitting operation:
- soliciting the interference assessment of the network while the transmitter has ceased the transmitting operation;
- when the interference assessment indicates cessation of the interference between the two or more transmitters in the network, determining that the interfering transmitter is the transmitter having the ceased transmitting operation; and
- when the interference assessment indicates continuance of the interference between the two or more transmitters in the network, continuing to the next sequential transmitter in the network.

14. The system of claim 9, wherein the interference isolation routine comprises a recursive operation comprising:
- ceasing the transmitting operations of a collection of transmitters in the network;
- soliciting the interference assessment of the network while the collection of transmitters has ceased the transmitting operations;
- when the interference assessment indicates cessation of the interference between the two or more transmitters in the network:
  - determining that the interfering transmitter is one of the transmitters having the ceased transmitting operations; and
  - continuing the recursive operation on a subset of the collection of transmitters in the network; and
- when the interference assessment indicates continuance of the interference between the two or more transmitters in the network, continuing the recursive operation on another collection of transmitters in the network.

15. The system of claim 9, wherein the operations further comprise ceasing the transmitting operations of all of the transmitters in the network periodically or according to an on/off pattern.

16. The system of claim 9, wherein the operations further comprise randomly ceasing the transmitting operations of all of the transmitters in the network for the threshold period of time.

17. A method comprising:
- receiving, at data processing hardware, an interference indication from at least one transmitter in a network, the interference indication indicating interference between two or more transmitters in the network;
- when the interference indication is received, sending a command from the data processing hardware to all of the transmitters in the network, the command when received by each transmitter in the network, causing each corresponding transmitter to transmit a corresponding sequence for a threshold period of time; and
- for each transmitter in the network:
  - determining, by the data processing hardware, whether a frequency offset of the interference between the two or more transmitters in the network corresponds to the transmitter; and
  - when the frequency offset of the interference between the two or more transmitters in the network corresponds to the transmitter, altering, by the data processing hardware, a transmission property of the transmitter, the altered transmission property ceasing the interference between the two or more transmitters in the network.

18. The method of claim 17, wherein the corresponding sequence of each transmitter is unique to the corresponding transmitter.

19. The method of claim 17, wherein the corresponding sequence of each transmitter occupies a full corresponding transmitted bandwidth.

20. The method of claim 17, wherein the corresponding sequence of each transmitter occupies a portion of a corresponding transmitted bandwidth.

21. A method comprising:
- receiving, at data processing hardware, an interference indication from at least one transmitter in a network, the interference indication indicating interference between two or more transmitters in the network;
- when the interference condition is received, sending a command from the data processing hardware to a group of transmitters in the network, the command when received by each transmitter in the group of transmitters, causing each corresponding transmitters in the group of transmitters to cease transmitting operations for a threshold period of time;
- soliciting, by the data processing hardware, an interference assessment from each one of the transmitters in the group of transmitters in the network for the threshold period of time when each one of the transmitters in the group of transmitters in the network ceased the transmitting operations; and
- when the interference assessment indicates cessation of the interference between the two or more transmitters in the network:
  - determining, by the data processing hardware, that the interfering transmitter resides inside of the group of transmitters in the network; and
  - executing, by the data processing hardware, an interference isolation routine configured to identify the interfering transmitter.

22. The method of claim 21, further comprising when the interfering transmitter is identified, altering, by the data processing hardware, a transmission property of the interfering transmitter, the altered transmission property ceasing the interference between the two or more transmitters in the network.

23. The method of claim 22, wherein the transmission property comprises a transmission frequency.

24. The method of claim 21, wherein the interference isolation routine comprises sequentially ceasing the transmitting operation of each transmitter in the group of transmitters, one at a time, to identify the interfering transmitter.

25. The method of claim 24, further comprising, for each transmitter having the ceased transmitting operation:
- soliciting the interference assessment of the network while the transmitter has ceased the transmitting operation;
- when the interference assessment indicates cessation of the interference between the two or more transmitters in the network, determining that the interfering transmitter is the transmitter having the ceased transmitting operation; and
- when the interference assessment indicates continuance of the interference between the two or more transmitters in the network, continuing to the next sequential transmitter in the group of transmitters.

26. The method of claim 21, further comprising ceasing the transmitting operations of the group of transmitters periodically or according to an on/off pattern.

27. The method of claim 21, further comprising randomly ceasing the transmitting operations of the group of transmitters for the threshold period of time.

* * * * *